(12) United States Patent
Lee et al.

(10) Patent No.: US 12,243,983 B2
(45) Date of Patent: Mar. 4, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Yeong Lee, Daejeon (KR); Hyun Seung Kim, Daejeon (KR); Chul Haeng Lee, Daejeon (KR); Young Min Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 510 days.

(21) Appl. No.: 17/771,529

(22) PCT Filed: Nov. 27, 2020

(86) PCT No.: PCT/KR2020/017099
§ 371 (c)(1),
(2) Date: Apr. 25, 2022

(87) PCT Pub. No.: WO2021/112501
PCT Pub. Date: Jun. 10, 2021

(65) Prior Publication Data
US 2022/0384850 A1    Dec. 1, 2022

(30) Foreign Application Priority Data

Dec. 5, 2019   (KR) .................. 10-2019-0160560

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/505* (2013.01); *H01M 4/525* (2013.01); *H01M 10/0525* (2013.01); *H01M 2300/0037* (2013.01)

(58) Field of Classification Search
CPC ......... H01M 10/0567; H01M 10/0564; H01M 10/05251; H01M 4/505; H01M 4/525; H01M 2300/0025; H01M 2300/0037
See application file for complete search history.

(56) References Cited

U.S. PATENT DOCUMENTS 6,806,989 B2   10/2004   Berneth
7,919,755 B2   4/2011    Rahman et al.
(Continued)

FOREIGN PATENT DOCUMENTS

EP        3022795 B1       8/2018
KR    20140065108 A       5/2014
(Continued)

OTHER PUBLICATIONS

WO2021/112501 (Year: 2021).*
(Continued)

*Primary Examiner* — Holly Rickman
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution includes a lithium salt, an organic solvent, and a compound represented by Formula 1 as an additive. A lithium secondary battery including the non-aqueous electrolyte solution has improved high-rate charge and discharge characteristics at high temperature.

11 Claims, 4 Drawing Sheets

(51) Int. Cl.
*H01M 4/525* (2010.01)
*H01M 10/0525* (2010.01)

(56) References Cited

U.S. PATENT DOCUMENTS

| | | | |
|---|---|---|---|
| 8,050,531 | B2 | 11/2011 | Rahman et al. |
| 2003/0129368 | A1 | 7/2003 | Berneth |
| 2007/0257234 | A1 | 11/2007 | Gerster et al. |
| 2008/0002329 | A1 | 1/2008 | Pohm et al. |
| 2008/0099698 | A1 | 5/2008 | Rahman et al. |
| 2008/0128618 | A1 | 6/2008 | Rahman et al. |
| 2009/0137800 | A1 | 5/2009 | Yanagisawa |
| 2012/0088869 | A1 | 4/2012 | Gerster et al. |
| 2012/0099827 | A1 | 4/2012 | Rahman et al. |
| 2016/0164141 | A1 | 6/2016 | Chesneau et al. |
| 2016/0254568 | A1 | 9/2016 | Chesneau et al. |
| 2017/0288288 | A1 | 10/2017 | Chesneau et al. |

FOREIGN PATENT DOCUMENTS

| | | |
|---|---|---|
| KR | 102039465 B1 | 11/2019 |
| WO | 2001014336 A1 | 3/2001 |
| WO | 2006017898 A1 | 2/2006 |
| WO | 2006024610 A2 | 3/2006 |
| WO | 2007129503 A1 | 11/2007 |

OTHER PUBLICATIONS

Extended European Search Report including Written Opinion for Application No. 20895096.4 dated Sep. 21, 2023, pp. 1-5.
Phiri Isheunesu et al: "Effects of novel benzotriazole based zwitterinoic salt as electrolyte additive for lithium ion batteries", Current Applied Physics, Elsevier, Amsterdam, NL, vol. 20, No. 1, Oct. 20, 2019 (Oct. 20, 2019), pp. 122-131, xp 085912552, DOI: 10.1016/J.CAP.2019.10.017.
Yamaguchi, S. et al., "Improvement of charge/discharge properties of oligoether electrolytes by zwitterions with an attached cyano group for use in lithium-ion secondary batteries," Electrochimica Acta, Nov. 2015, pp. 471-477, vol. 186, Elsevier.
Cole, J. C. et al., "(Z) {4-[1-Cyano-3-(diethyliminio)-1-propenyl]phenyl}dicyanomethanide, a Novel 'Blue Window' Zwitterionic Molecule for Non-Linear Optics," Apr. 1995, p. 715-718, vol. C51, No. 4.
Childs, R. F. et al., "Photochemical and Thermal Stereomutations of 3-Aryl-2-propenylideniminium Salts1," Journal of the American Chemical Society, Feb. 1983, pp. 5041-5046, vol. 105.
Childs. R. F et al., "The structures of some iminium salts. Crystal structures and 13C Nmr studies of 3-aryl-2- bropenylideniminium salts," Journal of Crystallographic and Spectroscopic Research, Jul. 1983, pp. 73-87, vol. 15, No. 1.
International Search Report for Application No. PCT/KR2020/017099 mailed Mar. 11, 2021, pp. 1-3.

* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2020/017099, filed on Nov. 27, 2020, which claims priority from Korean Patent Application No. 10-2019-0160560, filed on Dec. 5, 2019, the disclosures of which are incorporated by reference herein.

TECHNICAL FIELD

The present invention relates to a non-aqueous electrolyte solution for a lithium secondary battery and a lithium secondary battery including the same.

BACKGROUND ART

In line with a gradual increase in dependence on electrical energy in modern society, renewable energy capable of increasing production without causing environmental problems has emerged as a next-generation power generation system.

Since the renewable energy exhibits intermittent power generation characteristics, a large-capacity power storage device capable of stably supplying power is essentially required. A lithium-ion battery is in the spotlight as a device exhibiting the highest energy density which is currently commercialized among power storage devices.

The lithium-ion battery is composed of a positive electrode including a transition metal oxide containing lithium as a positive electrode active material, a negative electrode capable of storing the lithium, an electrolyte solution that includes an organic solvent containing a lithium salt, and a separator.

With respect to the positive electrode, energy is stored through a redox reaction of transition metal, wherein this results in the fact that the transition metal must be essentially included in a positive electrode material.

A reduction in performance of the battery occurs as the positive electrode active material structurally collapses during repeated charge and discharge. That is, metal ions, which have been dissolved from a surface of the positive electrode by structural collapse of the positive electrode, are electrodeposited on the negative electrode to degrade performance of the battery. This battery performance degradation phenomenon tends to further increase when a potential of the positive electrode is increased or when the battery is exposed to high temperatures.

In order to control such a degradation behavior, research has been conducted to apply an additive that forms a film on the positive electrode, and, in addition, research to suppress the electrodeposition of the dissolved transition metal on the negative electrode or the occurrence of ion substitution is being conducted.

DISCLOSURE OF THE INVENTION

Technical Problem

An aspect of the present invention provides a non-aqueous electrolyte solution for a lithium secondary battery which includes an additive capable of forming a complex with transition metal ions dissolved from a positive electrode.

Another aspect of the present invention provides a lithium secondary battery in which high-rate charge and discharge characteristics are improved by securing high-temperature performance by including the non-aqueous electrolyte solution for a lithium secondary battery.

Technical Solution

According to an aspect of the present invention, there is provided a non-aqueous electrolyte solution for a lithium secondary battery which includes a lithium salt, an organic solvent, and a compound represented by Formula 1 as an additive.

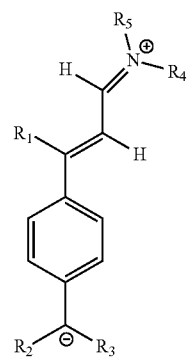

[Formula 1]

wherein, in Formula 1,
$R_1$ to $R_5$ are each independently hydrogen, a substituted or unsubstituted alkyl group having 1 to 5 carbon atoms, or —CN, wherein at least one of $R_1$ to $R_5$ is a —CN group.

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a lithium secondary battery of the present invention.

Advantageous Effects

A compound represented by Formula 1, which is included in a non-aqueous electrolyte solution of the present invention, is a compound having a structure of zwitter ion, a neutral molecule with positive and negative electric charges in one molecule, wherein ionic conductivity of the non-aqueous electrolyte solution may be further improved by the zwitter ion. Also, the compound represented by Formula 1 may form a stable film on a negative electrode by a double bond contained in its molecular structure and may form a complex with transition metal ions dissolved from a positive electrode of a lithium secondary battery by at least one cyano group contained in the molecular structure. Thus, the compound represented by Formula 1 may suppress ion substitution or electrodeposition of the transition metal ions on the negative electrode. As described above, the compound represented by Formula 1, which is included as an additive, may be decomposed before an organic solvent to form a film on a surface of the negative electrode and may reduce a concentration of metallic foreign matter in the electrolyte solution. Therefore, since the non-aqueous electrolyte solution may suppress a continuous decomposition reaction, a lithium secondary battery having improved charge and discharge characteristics may be achieved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
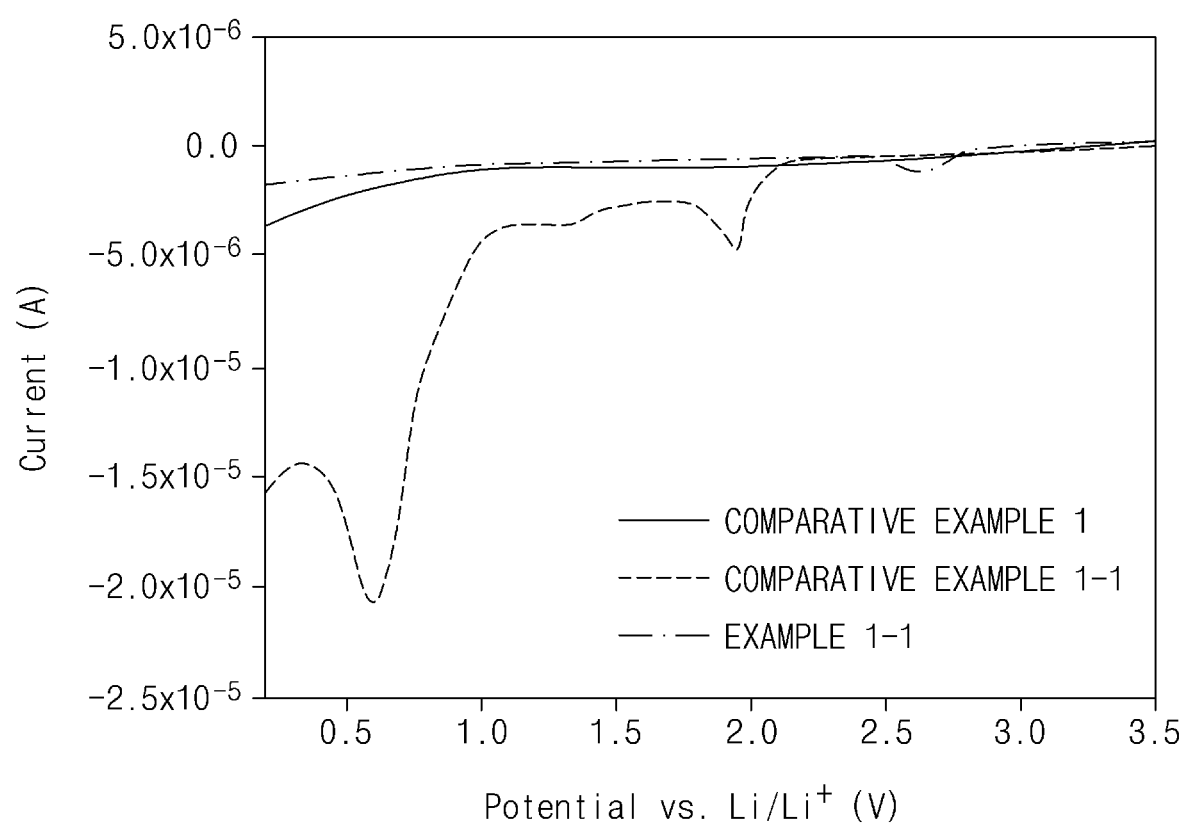
FIG. 1 is a graph illustrating the results of metal (Co) ion electrodeposition evaluation of non-aqueous electrolyte solutions according to Experimental Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Conventionally, transition metals are easily dissolved from a positive electrode into an electrolyte solution due to (i) an acid generated by a side reaction between the positive electrode and the electrolyte solution or an acid (e.g. hydrofluoric acid (HF)) formed by hydrolysis and thermal decomposition of a lithium salt, or (ii) structural variation of the positive electrode according to repeated charge and discharge, and dissolved transition metal ions are re-deposited on the positive electrode to be a cause of increasing resistance of the positive electrode. Also, since the transition metals moved to a negative electrode through the electrolyte solution are electrodeposited on the negative electrode to self-discharge the negative electrode and destruct a solid electrolyte interphase (SEI) that gives passivation ability to the negative electrode, interfacial resistance of the negative electrode is increased by promoting an additional electrolyte solution decomposition reaction. Since this series of reactions reduces an amount of available lithium ions in a secondary battery, it not only leads to the degradation of capacity of the secondary battery, but the decomposition reaction of the electrolyte solution is also accompanied, and thus, resistance of the secondary battery is increased.

Furthermore, in a case in which metallic foreign matter is included in the electrode when the electrode is prepared, the metallic foreign matter causes an internal short circuit of the secondary battery while being electrodeposited on a surface of the negative electrode during initial charge to grow into dendrites. Such a phenomenon becomes a major cause of low voltage failure.

The present invention aims to provide a non-aqueous electrolyte solution for a lithium secondary battery, which includes an additive which may not only form a robust film on the surface of the negative electrode through decomposition before an organic solvent but may also prevent the electrodeposition of metal ions on the negative electrode by forming a complex with the metal ions or metallic foreign matter, a cause of degradation and failure behavior as described above, and a lithium secondary battery in which high-rate charge and discharge characteristics at high temperature are improved by including the same.

Non-Aqueous Electrolyte Solution for Lithium Secondary Battery

According to an embodiment, the present invention provides a non-aqueous electrolyte solution for a lithium secondary battery which includes:

a lithium salt, an organic solvent, and a compound represented by Formula 1 as an additive.

[Formula 1]

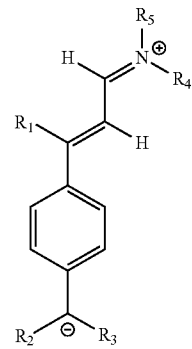

In Formula 1, $R_1$ to $R_5$ are each independently hydrogen, a substituted or unsubstituted alkyl group having 1 to 5 carbon atoms, or —CN, wherein at least one of $R_1$ to $R_5$ may be a —CN group.

(1) Lithium Salt

First, in the non-aqueous electrolyte solution for a lithium secondary battery of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_2PF_4^-$, $(CF_3)_6P_6^-$, $C_4F_9SO_3^-$, $CF_3CF_2SO_3^-$, $CF_3CF_2$ $(CF_3)_2CO^-$, $(CF_3SO_2)_2CH^-$, $CF_3$ $(CF_2)_2SO_3^-$, and $SCN^-$ as an anion.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPk$_6$, LiCk$_3$SO$_3$, LiCH$_3$CO$_2$, LiCF$_3$CO$_2$, LiAsF$_6$, LiSbF$_6$, LiCH$_3$SO$_3$, LiFSI (lithium bis(fluorosulfonyl)imide, $LiN(SO_2F)_2$), LiBETI (lithium bis(perfluoroethanesulfonyl)imide, $LiN(SO_2CF_2CF_3)_2$), and LiTFSI (lithium bis(trifluoromethanesulfonyl)imide, $LiN(SO_2CF_3)_2$), or a mixture of two or more thereof. In addition to them, any lithium salt commonly used in an electrolyte solution of a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of a surface of an electrode.

If the concentration of the lithium salt is less than 0.8 M, an effect of improving low-temperature output of the lithium secondary battery and improving cycle characteristics during high-temperature storage is insignificant, and, if the concentration of the lithium salt is greater than 4.0 M, impregnability of the electrolyte solution may be reduced due to an increase in viscosity of the non-aqueous electrolyte solution.

(2) Organic Solvent

In the non-aqueous electrolyte solution for a lithium secondary battery according to the present specification, the organic solvent may include a cyclic carbonate-based organic solvent, a linear carbonate-based organic solvent, or a mixed non-aqueous organic solvent thereof.

The cyclic carbonate-based organic solvent is an organic solvent which may well dissociate a lithium salt in an electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In order to prepare an electrolyte solution having high ionic conductivity, a mixed organic solvent of the cyclic carbonate-based organic solvent and the linear carbonate-based organic solvent may be used as the organic solvent.

Furthermore, the organic solvent may further include a linear ester-based organic solvent and/or a cyclic ester-based organic solvent in addition to the cyclic carbonate-based organic solvent and/or the linear carbonate-based organic solvent.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) Additive

The non-aqueous electrolyte solution for a lithium secondary battery of the present invention may include a compound represented by the following Formula 1 as an additive.

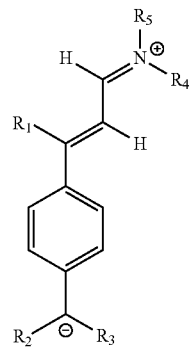

[Formula 1]

In Formula 1, $R_1$ to $R_5$ are each independently hydrogen, a substituted or unsubstituted alkyl group having 1 to 5 carbon atoms, or —CN, wherein at least one of $R_1$ to $R_5$ may be a —CN group.

Also, in Formula 1, $R_1$ to $R_5$ are each independently hydrogen, a substituted or unsubstituted alkyl group having 1 to 3 carbon atoms, or —CN, wherein at least one of $R_1$ to $R_5$ may be a —CN group.

Specifically, in Formula 1, $R_1$ is —CN, and $R_2$ to $R_5$ are each independently hydrogen, a substituted or unsubstituted alkyl group having 1 to 3 carbon atoms, or —CN, wherein at least one of $R_2$ to $R_5$ may be a —CN group.

More specifically, in Formula 1, $R_1$ is —CN, and $R_2$ to $R_5$ are each independently a substituted or unsubstituted alkyl group having 1 to 3 carbon atoms or —CN, wherein at least one of $R_2$ to $R_5$ may be a —CN group.

More specifically, in Formula 1, $R_1$ may be —CN, $R_2$ and $R_3$ each may be —CN, and $R_4$ and $R_5$ each may be a substituted or unsubstituted alkyl group having 1 to 3 carbon atoms.

Preferably, the compound represented by Formula 1 may be a compound represented by the following Formula 1a, for example, an N-[3-cyano-3-[4-(dicyanomethyl)phenyl]-2-propenylidene]-N-ethyl-ethaniminium inner salt.

[Formula 1a]

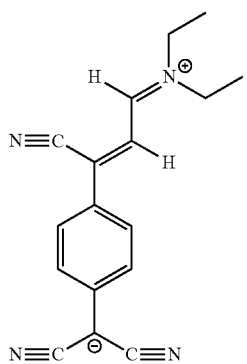

The compound represented by Formula 1, which is included as an electrolyte solution additive in the present invention, is a compound having a structure of zwitterion, a neutral molecule with positive and negative electric charges in one molecule. Thus, with respect to the non-aqueous electrolyte solution including the compound, ionic conductivity may be further improved by the compound represented by Formula 1. Also, a stable film may be formed on the negative electrode due to a double bond contained in the molecule.

Particularly, the compound represented by Formula 1 contains at least one cyano group as well as the zwitterion in the molecule, wherein the cyano group may suppress ion substitution or electrodeposition of the metal ions on the negative electrode by forming a complex with the transition metal ions dissolved from the positive electrode of the lithium secondary battery. Accordingly, since the non-aqueous electrolyte solution including the compound as the additive may form a film on the surface of the negative electrode through decomposition before the organic solvent and may reduce a concentration of metallic foreign matter in the electrolyte solution, a continuous decomposition reaction of the non-aqueous electrolyte solution may be suppressed. Thus, if the non-aqueous electrolyte solution including the compound represented by Formula 1 is included, a lithium secondary battery having improved high-rate charge and discharge characteristics may be achieved.

The compound of Formula 1 may be included in an amount of 0.05 wt % to 1 wt %, for example, 0.1 wt to 1 wt % based on a total weight of the non-aqueous electrolyte solution.

In a case in which the compound represented by Formula 1 is included in an amount within the above range, a secondary battery having more improved overall performance may be prepared. For example, in the case that the compound represented by Formula 1 is included in an amount of 0.05 wt % to 1 wt %, it may remove the metal ions by forming a complex with the metal ions and may simultaneously form a robust film on the surface of the positive electrode while suppressing disadvantages, such as a side reaction caused by the additive, a reduction in capacity, and a increase in resistance, as much as possible. If the amount of the compound represented by Formula 1 included is greater than 1 wt %, since initial capacity is not only reduced, but solubility of the additive in the non-aqueous organic solvent is also reduced, the side reaction caused by the additive and the resistance may increase. For example, since the compound represented by Formula 1 in the non-aqueous electrolyte solution has low solubility in the non-aqueous organic solvent, it is not dissolved but remains and causes the side reaction if it is included in an amount of greater than 1 wt % in the non-aqueous electrolyte, and thus, it is not easy to achieve a secondary battery having stable physical properties.

Lithium Secondary Battery

Also, in another embodiment of the present invention, there is provided a lithium secondary battery including the non-aqueous electrolyte solution for a lithium secondary battery of the present invention.

Specifically, the lithium secondary battery of the present invention may be prepared by forming an electrode assembly, in which a positive electrode, a negative electrode, and a separator disposed between the positive electrode and the negative electrode are sequentially stacked, accommodating the electrode assembly in a battery case, and then injecting the non-aqueous electrolyte solution of the present invention. A typical method known in the art may be used as a method of preparing the lithium secondary battery of the present invention.

The positive electrode, the negative electrode, and the separator, which constitute the lithium secondary battery of the present invention, are as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the secondary battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal selected from the group consisting of nickel (Ni), cobalt (Co), manganese (Mn), iron (Fe), and aluminum (Al).

More specifically, the lithium composite metal oxide may include at least one selected from the group consisting of lithium-manganese-based oxide (e.g., $LiMnO_2$, $LiMn_2O_4$, etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$)), and lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2-1$)). Specifically, the lithium composite metal oxide may include at least one selected from $LiMnO_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, and $Li(Ni_{0.89}Co_{0.05}Mn_{0.05}Al_{0.01})O_2$ (NCMA). More specifically, the lithium composite metal oxide may be used by mixing $LiMn_2O_4$ and $Li(Ni_{0.89}Co_{0.05}Mn_{0.05}Al_{0.01})O_2$ (NCMA). Particularly, in a case in which the additive of the present invention is used together with a positive electrode including at least one of the lithium-manganese-based oxide and/or the lithium-nickel-cobalt-transition metal (M) oxide in which dissolution of transition metal from the positive electrode more easily occurs than that from the lithiumnickel-manganese-cobalt-based oxide, a better effect of suppressing metal dissolution may be achieved to improve initial capacity.

In addition, the lithium composite metal oxide may further include at least one selected from lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2)), lithium-nickel-cobalt-based oxide (e.g., $LiNi_{1-Y1}Co_{Y1}O_2$ (where 0<Y1<1)), lithium-manganese-cobalt-based oxide (e.g., $LiCo_{1-Y2}Mn_{Y2}O_2$ (where 0<Y2<1) or $LiMn_{2-Z1}Co_{Y1}O_4$ (where 0<Z1<2)), and $Li(Ni_{p1}Co_{q1}Mn_{r2})O_4$ (where 0<p1<2, 0<q1<2, 0<r2<2, and p1+q1+r2=2). Specifically, the lithium composite metal oxide may include $LiCoO_7$, $LiNiO_2$, or lithium nickel cobalt aluminum oxide (e.g., $Li(Ni_{0.08}Co_{0.15}Al_{0.05})O_2$, etc.), and, in consideration of a significant improvement due to the control of type and content ratio of elements constituting the lithium composite metal oxide, any one thereof or a mixture of two or more thereof may be used.

The positive electrode active material may be included in an amount of 80 wt % to 99 wt %, for example, 90 wt % to 99 wt % based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

Also, the conductive agent is a material providing conductivity without causing adverse chemical changes in the secondary battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the secondary battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ (0≤x≤1), $Li_xWO_2$ (0≤x≤1), and $Sn_xMe_{1-x}Me'_yO_Z$ (Me:manganese (Mn), Fe, Pb, or Ge; Me': Al, boron (B), phosphorus (P), Si, Groups I, II and III elements of the periodic table, or halogen; 0<x≤1; 1≤y≤3; 1≤z≤8) may be used as the metal composite oxide.

The material, which may be doped and undoped with lithium, may include Si, $SiO_x$ (0<x≤2), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The conductive agent is a component for further improving the conductivity of the negative electrode active material, wherein the conductive agent may be added in an amount of 1 wt to 20 wt % based on the total weight of the solid content in the negative electrode slurry. Any conductive agent may be used without particular limitation so long as it has conductivity without causing adverse chemical changes in the secondary battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 95 wt %, for example, 80 wt % to 90 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Non-Aqueous Electrolyte Solution for Lithium Secondary Battery Comparative Example 1

After ethylene carbonate (EC) and ethyl methyl carbonate (EMC) were mixed in a volume ratio of 1:2, $LiPF_6$ was dissolved such that a concentration of the $LiPF_6$ was 1.0 M to prepare an electrolyte solution (A-1).

Comparative Example 2

After ethylene carbonate (EC) and ethyl methyl carbonate (EMC) were mixed in a volume ratio of 3:7, $LiPF_6$ was dissolved such that a concentration of the $LiPF_6$ was 1.0 M to prepare an electrolyte solution (A-2).

Example 1

A non-aqueous electrolyte solution (B-1) for a lithium secondary battery was prepared by adding 0.1 g of the compound of Formula 1a to 99.9 g of the electrolyte solution (A-1).

Example 2

A non-aqueous electrolyte solution (B-2) for a lithium secondary battery was prepared by adding 0.1 g of the compound of Formula 1a to 99.9 g of the electrolyte solution (A-2).

Example 3

A non-aqueous electrolyte solution (B-3) for a lithium secondary battery was prepared by adding 1.2 g of the compound of Formula 1a to 98.8 g of the electrolyte solution (A-2).

II. Secondary Battery Preparation

Example 4

A positive electrode active material ($Li(Ni_{0.6}Co_{0.2}Mn_{0.2})O_2$; NCM 622), carbon black as a conductive agent, and polyvinylidene fluoride, as a binder, were added to N-methyl-2-pyrrolidone (NMP), as a solvent, at a weight ratio of 98:1:1 to prepare a positive electrode slurry (solid content 40 wt %). A 20 μm thick positive electrode collector (Al thin film) was coated with the positive electrode slurry, dried, and roll-pressed to prepare a positive electrode.

A negative electrode active material (artificial graphite: natural graphite=90:10 weight ratio), carbon black as a conductive agent, an SBR as a binder, and CMC, as a thickener, were added to NMP at a weight ratio of 95.6:1: 2.3:1.1 to prepare a negative electrode slurry (solid content: 90 wt %). A 10 μm thick copper (Cu) thin film, as a negative electrode collector, was coated with the negative electrode slurry, dried, and roll-pressed to prepare a negative electrode.

After a mono-cell was prepared by sequentially stacking the above-prepared positive electrode, a separator formed of a porous polyethylene film, and the negative electrode, the mono-cell was put in a pouch type secondary battery case, and the non-aqueous electrolyte solution (B-2) for a lithium secondary battery prepared in Example 2 was injected thereinto to prepare a pouch type lithium secondary battery.

Example 5

A pouch type lithium secondary battery was prepared in the same manner as in Example 4 except that the non-aqueous electrolyte solution (B-3) for a lithium secondary battery prepared in Example 3, instead of the non-aqueous electrolyte solution for a lithium secondary battery of Example 2, was used as the non-aqueous electrolyte solution.

Example 6

A positive electrode active material ($LiMn_2O_4$:Li($Ni_{0.89}Co_{0.05}Mn_{0.05}Al_{0.01}$) $O_2$ (NCMA)=55:45 weight ratio), carbon black as a conductive agent, and polyvinylidene fluoride, as a binder, were added to N-methyl-2-pyrrolidone (NMP), as a solvent, at a weight ratio of 98:1:1 to prepare a positive electrode slurry (solid content 40 wt %). A 20 μm thick positive electrode collector (Al thin film) was coated with the positive electrode slurry, dried, and roll-pressed to prepare a positive electrode.

A negative electrode active material (artificial graphite: natural graphite=90:10 weight ratio), carbon black as a conductive agent, an SBR as a binder, and CMC, as a thickener, were added to NMP at a weight ratio of 95.6:1: 2.3:1.1 to prepare a negative electrode slurry (solid content: 90 wt %). A 10 μm thick copper (Cu) thin film, as a negative electrode collector, was coated with the negative electrode slurry, dried, and roll-pressed to prepare a negative electrode.

After a bi-cell was prepared by sequentially stacking the above-prepared positive electrode, a separator formed of a porous polyethylene film, and the negative electrode, the bi-cell was put in a pouch type secondary battery case, and the non-aqueous electrolyte solution (B-2) for a lithium secondary battery prepared in Example 2 was injected thereinto to prepare a pouch type lithium secondary battery.

Comparative Example 3

A pouch type lithium secondary battery was prepared in the same manner as in Example 4 except that the electrolyte solution (A-2) of Comparative Example 2, instead of the non-aqueous electrolyte solution for a lithium secondary battery of Example 2, was used.

Comparative Example 4

A pouch type lithium secondary battery was prepared in the same manner as in Example 6 except that the electrolyte solution (A-2) of Comparative Example 2, instead of the non-aqueous electrolyte solution for a lithium secondary battery of Example 2, was used.

Experimental Examples

Experimental Example 1. Metal (Co) Ion Electrodeposition Evaluation

A non-aqueous electrolyte solution for metal ion electrodeposition evaluation of Example 1-1 was prepared by adding 0.1 g of cobalt (II) tetrafluoroborate hexahydrate ($Co(BF_4)_2 \cdot 6H_2O$), metallic foreign matter, as an optional component, to 99.9 g of the non-aqueous electrolyte solution (B-1) for a lithium secondary battery which was prepared in Example 1. Also, a non-aqueous electrolyte solution for metal ion electrodeposition evaluation of Comparative Example 1-1 was prepared by adding 0.1 g of cobalt (II) tetrafluoroborate hexahydrate ($Co(BF_4)_2 \cdot 6H_2O$), metallic foreign matter, as an optional component, to 99.9 g of the electrolyte solution (A-1) prepared in Comparative Example 1 (see Table 1 below).

TABLE 1

| | Non-aqueous electrolyte solution amount (g) | Metallic foreign matter Type | Addition amount (g) |
| --- | --- | --- | --- |
| Example 1-1 | B-1 99.9 | Cobalt (II) tetrafluoroborate hexahydrate ($Co(BF_4)_2 \cdot 6H_2O$) | 0.1 |
| Comparative Example 1-1 | A-1 99.9 | | 0.1 |

Then, electrochemical stabilities of the electrolyte solution (A-1) prepared in Comparative Example 1 not containing metallic foreign matter and the non-aqueous electrolyte solutions for metal ion electrodeposition evaluation of Example 1-1 and Comparative Example 1-1 containing metallic foreign matter were measured using linear sweep voltammetry (LSV) to evaluate an effect of removing transition metal (Co) ions.

In this case, a working electrode was a platinum (Pt) disk (Φ1.6 mm) electrode, a reference electrode was lithium metal, a Pt wire electrode was used as an auxiliary electrode, and the measurement was made at a scan rate of 10 mV/s in an open circuit voltage (OCV) range of about 0.2 V. The measurement was performed in a glove box in an argon (Ar) atmosphere having moisture and oxygen concentrations at 23° C. of 10 ppm or less, and the results thereof are presented in FIG. 1.

Referring to FIG. 1, it may be understood that the non-aqueous electrolyte solution for metal ion electrodeposition evaluation of Comparative Example 1-1 only containing metallic foreign matter without an additive exhibited a rapid change in current between 0.5 V and 2.5 V in comparison to the electrolyte solution (A-1) of Comparative Example 1. It seems that Co metal ions were electrodeposited on the surface of the negative electrode to cause a side reaction.

In contrast, with respect to the non-aqueous electrolyte solution for metal ion electrodeposition evaluation of Example 1-1 of the present invention which included the additive together with metallic foreign matter, it may be understood that the rapid change in the current between 0.5 V and 2.5 V was suppressed even if the metallic foreign matter was included. The reason for this was due to the fact that, since the compound represented by Formula 1, which was included in the non-aqueous electrolyte solution for metal ion electrodeposition evaluation of Example 1-1, formed a stable film on the Pt disk electrode while reductively decomposed at a higher potential than the non-aqueous electrolyte solution for metal ion electrodeposition evaluation of Comparative Example 1-1, it suppressed the electrodeposition of Co and simultaneously formed a complex with the metal ions to reduce the concentration of the free Co ions in the electrolyte solution.

Experimental Example 2. Decomposition Start Voltage Measurement

Decomposition start voltages were measured for the non-aqueous electrolyte solution (B-2) for a lithium secondary battery prepared in Example 2 and the electrolyte solution (A-2) prepared in Comparative Example 2 using linear sweep voltammetry (LSV).

In this case, a working electrode was a platinum (Pt) disk (Φ1.6 mm) electrode, a reference electrode was lithium metal, a Pt wire electrode was used as an auxiliary electrode, and the measurement was made at a scan rate of 20 mV/s in an open circuit voltage (OCV) range of about 6 V. The measurement was performed in a glove box in an argon (Ar) atmosphere having moisture and oxygen concentrations at 23° C. of 10 ppm or less, and the results thereof are presented in FIG. 2.

Figure 2:
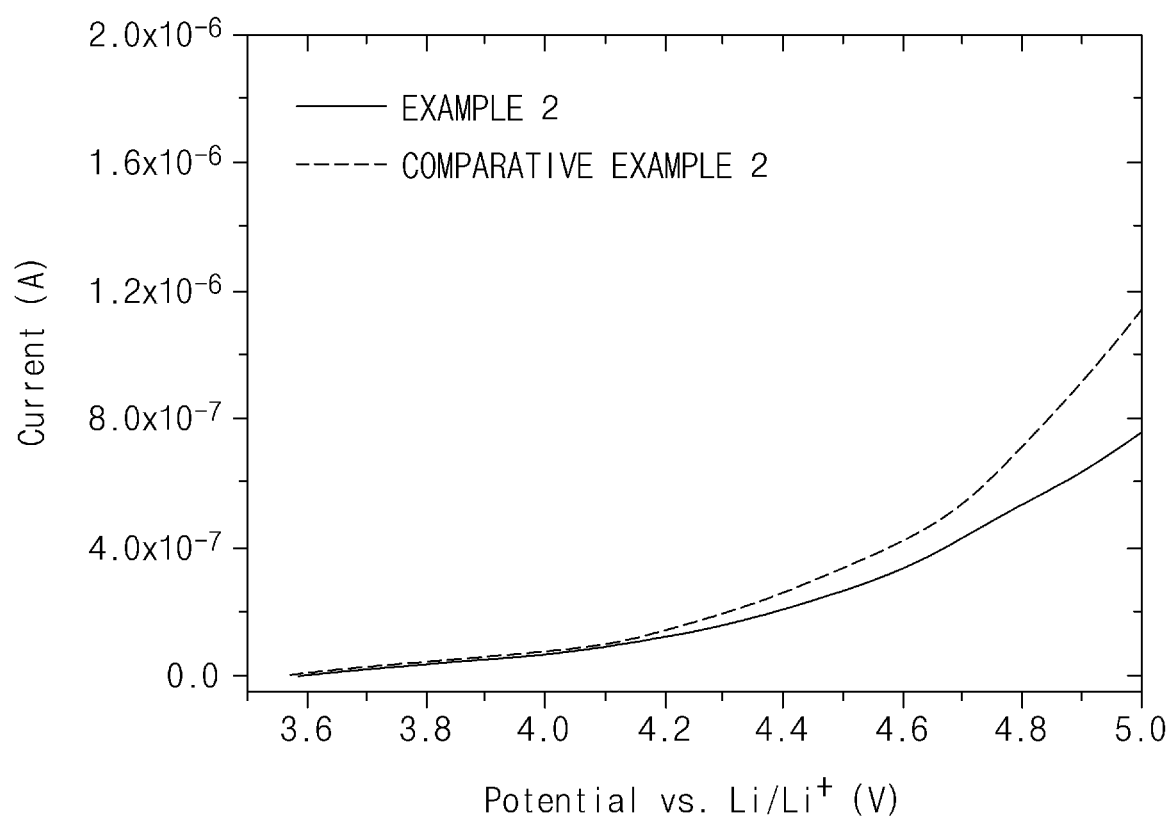
FIG. 2 is a graph illustrating the results of decomposition start voltage measurement of non-aqueous electrolyte solutions of Example 2 and Comparative Example 2 according to Experimental Example 2.

Referring to FIG. 2, with respect to the non-aqueous electrolyte solution (B-2) for a lithium secondary battery of Example 2, it may be confirmed that current density vs. charge potential was lower than that of the electrolyte solution (A-2) of Comparative Example 2. As described above, the low current density seems to be because an oxidation reaction, for example, decomposition of the electrolyte solution occurred less.

Experimental Example 3. Initial Capacity Evaluation Test (1)

After charging of each of the secondary batteries prepared in Examples 4 and 5 and Comparative Example 3 at 0.33 C rate to 4.2 V/2.59 mA under a constant current-constant voltage (CC-CV) condition at room temperature (25° C.) and discharging of each secondary battery at 0.33 C rate under a CC condition to 3.0 V were repeated twice, discharge capacity in the last step was calculated as initial capacity. The results thereof are presented in Table 2 below.

TABLE 2

|  | 0.33 C capacity (mAh) |
| --- | --- |
| Example 4 | 51.9 |
| Example 5 | 51.6 |
| Comparative Example 3 | 51.6 |

As illustrated in Table 2, it may be understood that initial capacity of the secondary battery of Comparative Example 3 was 51.6 mAh, but initial capacity of the secondary battery of Example 4 was improved to 51.9 mAh. With respect to the secondary battery of Example 5 including the non-aqueous electrolyte solution in which the amount of the compound of Formula 1 was greater than 1 wt %, it may be understood that, since resistance was increased, initial capacity was equivalent to that of Comparative Example 3.

Experimental Example 4. Initial Capacity Evaluation Test (2)

After charging of each of the secondary batteries prepared in Example 6 and Comparative Example 4 at 0.33 C rate to 4.2 V/4.64 mA under a constant current-constant voltage (CC-CV) condition at room temperature (25° C.) and discharging of each secondary battery at 0.33 C rate under a CC condition to 2.5 V were repeated twice, discharge capacity in the last step was calculated as initial capacity. The results thereof are presented in Table 3 below.

TABLE 3

|  | 0.33 C capacity (mAh) |
| --- | --- |
| Example 6 | 93.2 |
| Comparative Example 4 | 90.7 |

As illustrated in Table 3, it may be understood that initial capacity of the secondary battery of Comparative Example 4 was 90.7 mAh, but initial capacity of the secondary battery of Example 6 was improved to 93.2 mAh.

Experimental Example 5. Room-temperature Output Characteristics

Figure 3:
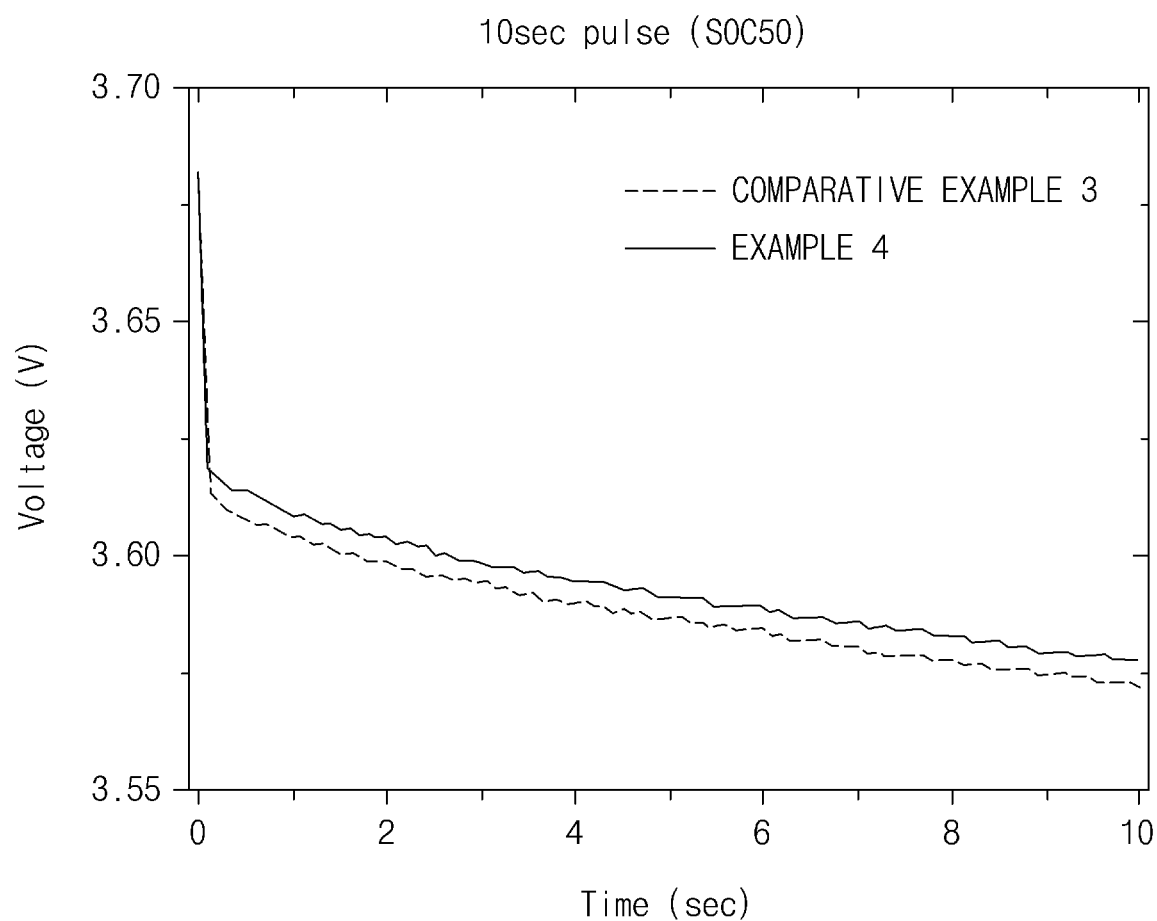
FIG. 3 is a graph illustrating the results of room-temperature output characteristics evaluation of lithium secondary batteries of Example 4 and Comparative Example 3 according to Experimental Example 5.

A graph, in which each of the secondary battery prepared in Example 4 and the lithium secondary battery prepared in Comparative Example 3 was discharged at 2.5 C for 10 seconds at a state of charge (SOC) of 50% at room temperature (25° C.), was illustrated in FIG. 3.

Figure 4:
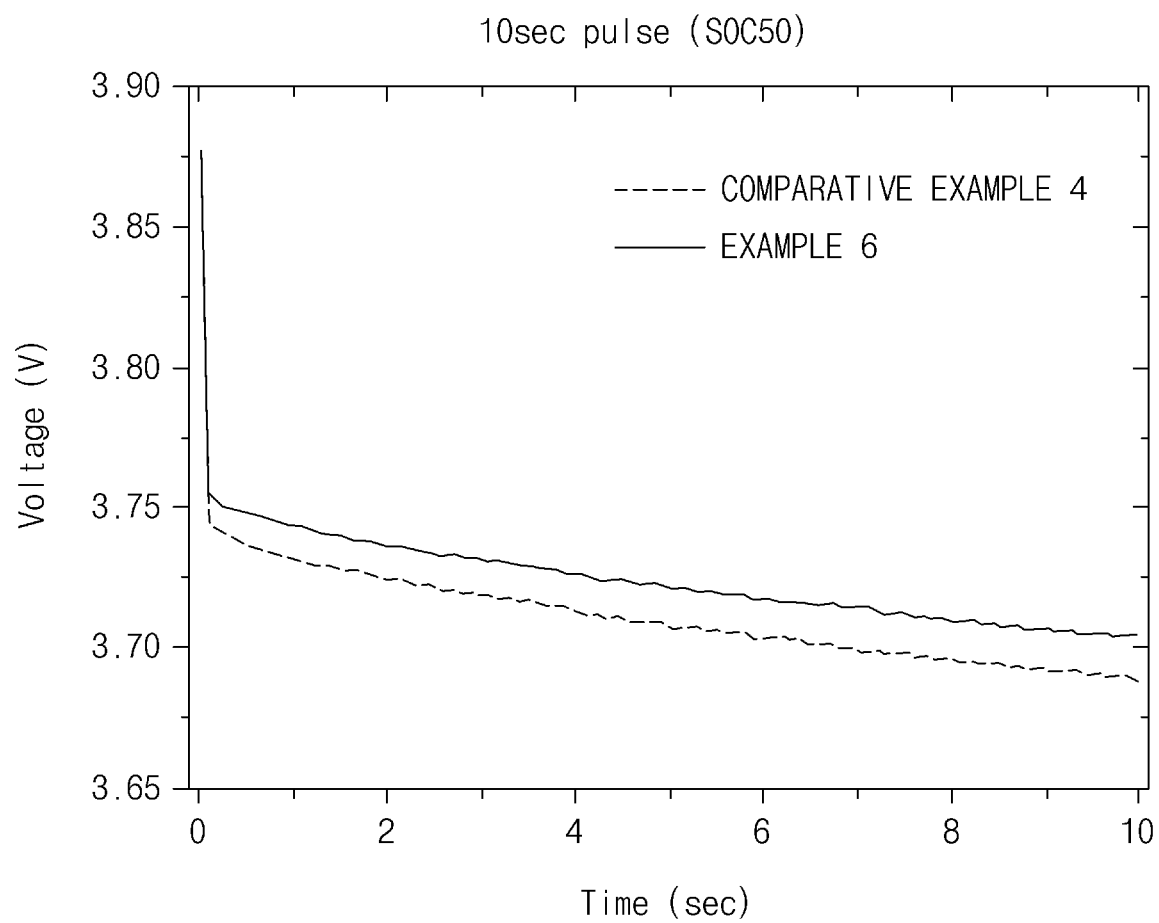
FIG. 4 is a graph illustrating the results of room-temperature output characteristics evaluation of lithium secondary batteries of Example 6 and Comparative Example 4 according to Experimental Example 5.

Also, a graph, in which each of the secondary battery prepared in Example 6 and the lithium secondary battery prepared in Comparative Example 4 was discharged at 2.5 C for 10 seconds at a state of charge (SOC) of 50% at room temperature (25° C.), was illustrated in FIG. 4.

Referring to FIGS. 3 and 4, it may be confirmed that the secondary batteries of Examples 4 and 6, which included the non-aqueous electrolyte solution including the additive of the present invention, had a smaller voltage drop than the secondary batteries of Comparative Examples 3 and 4 which included the non-aqueous electrolyte solution not including the additive, respectively. As described above, since the small voltage drop means low internal resistance of the secondary battery, it may be predicted that output characteristics of the secondary battery are improved.

Particularly, with respect to the secondary battery of Example 6 which included the positive electrode including the mixed positive electrode active material of LMO/NCMA, it may be understood that a degree of improvement in room-temperature clean Substitute Specification output characteristics was increased in comparison to that of the secondary battery of Example 4 which included the positive electrode including the NCM 622 positive electrode active material.

Experimental Example 6. High-temperature (45° C.) Cycle Characteristics Evaluation Each of the lithium secondary battery prepared in Example 4 and the secondary battery prepared in Comparative Example 3 was charged at 1 C rate to 4.25 V under a constant current/constant voltage (CC/CV) condition at 45° C. until the current reached 1/20 (mA) of 1 C and then discharged at a current of 1 C to 3.0 V. The above charging and discharging were set as one cycle, and 25 cycles and 50 cycles were repeated. Then, discharge capacity retentions after 25 cycles and 50 cycles were calculated using the following Equation 1, and the results thereof are presented in Table 4.

[Equation 1]

Discharge capacity retention (%)=(discharge capacity after $N^{th}$ charge and discharge/discharge capacity after $1^{st}$ charge and discharge)×100

TABLE 4

| Number | Discharge capacity retention (%) | |
|---|---|---|
| of cycles | Example 4 | Comparative Example 3 |
| 1 | 100 | 100 |
| 25 | 99.2 | 98.2 |
| 50 | 97.8 | 96.6 |

Referring to Table 4, with respect to the secondary battery of Example 4 which included the non-aqueous electrolyte solution including the additive of the present invention, it may be understood that 1 C discharge capacity retentions (%) after $25^{th}$ and $50^{th}$ charge/discharge cycles were greater than those of the secondary battery of Comparative Example 3, respectively. Thus, it may be confirmed that the high-rate discharge capacity retention at high temperature was improved when the non-aqueous electrolyte solution including the additive of the present invention was included.

Experimental Example 7. High-temperature (45° C.) Cycle Characteristics Evaluation (LMO/NCMA Secondary Battery)

Each of the lithium secondary battery prepared in Example 6 and the secondary battery prepared in Comparative Example 4 was charged at 1 C rate to 4.2 V under a constant current/constant voltage (CC/CV) condition at 45° C. until the current reached 1/20 (mA) of 1 C and then discharged at a current of 1 C to 2.5 V. The above charging and discharging were set as one cycle, and 25 cycles and 50 cycles were repeated. Then, discharge capacity retentions after 25 cycles and 50 cycles were calculated using Equation 1, and the results thereof are presented in Table 5.

TABLE 5

| Number of | Discharge capacity retention (%) | |
|---|---|---|
| cycles | Example 6 | Comparative Example 4 |
| 1 | 100 | 100 |
| 25 | 96.8 | 94.9 |
| 50 | 96.7 | 93.5 |

Referring to Table 5, with respect to the secondary battery of Example 6 including the additive of the present invention, it may be understood that 1 C discharge capacity retentions (%) after 25th and 50'h charge/discharge cycles were greater than those of the secondary battery of Comparative Example 4, respectively. Thus, with respect to the secondary battery which included the non-aqueous electrolyte solution including the additive of the present invention, it may be confirmed that the high-rate discharge capacity retention was improved even at high temperature.

The invention claimed is:

1. A non-aqueous electrolyte solution for a lithium secondary battery, the non-aqueous electrolyte solution comprising:

a lithium salt;
an organic solvent; and
a compound represented by Formula 1 as an additive

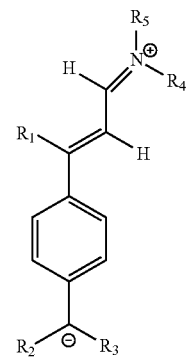

[Formula 1]

wherein, in Formula 1,
$R_1$ to $R_5$ are each independently hydrogen, a substituted or unsubstituted alkyl group having 1 to 5 carbon atoms, or —CN, wherein at least one of $R_1$ to $R_5$ is a —CN group.

2. The non-aqueous electrolyte solution for a lithium secondary battery of claim 1, wherein, in Formula 1, $R_1$ to $R_5$ are each independently hydrogen, a substituted or unsubstituted alkyl group having 1 to 3 carbon atoms, or —CN, wherein at least one of $R_1$ to $R_5$ is a —CN group.

3. The non-aqueous electrolyte solution for a lithium secondary battery of claim 1, wherein, in Formula 1, $R_1$ is —CN, and $R_2$ to $R_5$ are each independently hydrogen, a substituted or unsubstituted alkyl group having 1 to 3 carbon atoms, or —CN, wherein at least one of $R_2$ to $R_5$ is a —CN group.

4. The non-aqueous electrolyte solution for a lithium secondary battery of claim 1, wherein, in Formula 1, $R_1$ is —CN, and $R_2$ to $R_5$ are each independently a substituted or unsubstituted alkyl group having 1 to 3 carbon atoms or —CN, wherein at least one of $R_2$ to $R_5$ is a —CN group.

5. The non-aqueous electrolyte solution for a lithium secondary battery of claim 1, wherein, in Formula 1, $R_1$ to $R_3$ each are —CN, and $R_4$ and $R_5$ each are a substituted or unsubstituted alkyl group having 1 to 3 carbon atoms.

6. The non-aqueous electrolyte solution for a lithium secondary battery of claim 1, wherein the compound represented by Formula 1 comprises a compound represented by Formula 1a

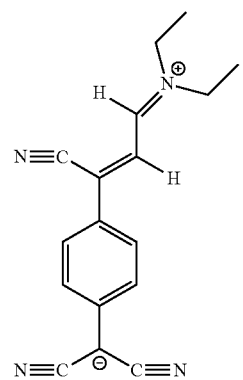

[Formula 1a]

7. The non-aqueous electrolyte solution for a lithium secondary battery of claim 1, wherein the compound represented by Formula 1 is present in an amount of 0.05 wt % to 1 wt % based on a total weight of the non-aqueous electrolyte solution.

8. The non-aqueous electrolyte solution for a lithium secondary battery of claim 7, wherein the compound represented by Formula 1 is present in an amount of 0.1 wt % to 1 wt % based on the total weight of the non-aqueous electrolyte solution.

9. A lithium secondary battery, comprising:
a negative electrode;
a positive electrode;
a separator disposed between the negative electrode and the positive electrode; and
a non-aqueous electrolyte solution,
wherein the non-aqueous electrolyte solution comprises the non-aqueous electrolyte solution of claim 1.

10. The lithium secondary battery of claim 9, wherein the positive electrode comprises at least one positive electrode active material selected from the group consisting of a lithium-manganese-based oxide, a lithium-nickel-manganese-cobalt-based oxide, and a lithium-nickel-cobalt-transition metal (M) oxide.

11. The lithium secondary battery of claim 10, wherein the positive electrode active material comprises at least one selected from the group consisting of the lithium-manganese-based oxide and the lithium-nickel-cobalt-transition metal (M) oxide.

* * * * *